United States Patent [19]
Ohgke et al.

[11] Patent Number: 5,631,421
[45] Date of Patent: May 20, 1997

[54] PIEZOELECTRIC ACCELERATION TRANSDUCER

[75] Inventors: Thomas Ohgke; Dieter Nägele, both of Kirchheim; Gerald Brinks, Burgrieden; Manfred Weinacht; Viktor Tiederle, both of Dettingen, all of Germany

[73] Assignee: Temic Telefunken microelectronic GmbH, Heilbronn, Germany

[21] Appl. No.: 554,825

[22] Filed: Nov. 7, 1995

[30] Foreign Application Priority Data

Nov. 10, 1994 [DE] Germany .......................... 44 40 078.0

[51] Int. Cl.$^6$ ................................................. G01P 15/09
[52] U.S. Cl. ..................... 73/514.34; 73/514.16; 73/493
[58] Field of Search .................... 73/493, 497, 514.34, 73/514.38, 431, 514.35, 514.36, 514.16; 310/329, 330, 332, 345, 348, 351, 352, 353, 354

[56] References Cited

U.S. PATENT DOCUMENTS

| | | | |
|---|---|---|---|
| 3,167,668 | 1/1965 | Nesh | 310/345 |
| 3,609,417 | 9/1971 | Kaname | 310/345 |
| 4,267,480 | 5/1981 | Kanematsu et al. | 310/354 |
| 4,700,973 | 10/1987 | Gademann et al. | 73/493 |
| 5,063,782 | 11/1991 | Kellet | 73/514.34 |
| 5,088,326 | 2/1992 | Wada et al. | 73/497 |
| 5,118,981 | 6/1992 | Kobayashi et al. | 310/345 |
| 5,235,237 | 8/1993 | Leonhardt | 310/332 |
| 5,473,930 | 12/1995 | Gademann et al. | 73/514.34 |

FOREIGN PATENT DOCUMENTS

| | | | |
|---|---|---|---|
| 616222 | 9/1994 | European Pat. Off. | 73/514.34 |
| 2712359 | 10/1977 | Germany . | |
| 2846371 | 5/1980 | Germany . | |
| 3019551 | 1/1981 | Germany . | |
| 9116730 U | 12/1993 | Germany . | |
| 6-148228 | 5/1994 | Japan | 73/514.34 |

*Primary Examiner*—Hezron E. Williams
*Assistant Examiner*—Helen C. Kwok
*Attorney, Agent, or Firm*—Spencer & Frank

[57] ABSTRACT

A piezoelectric acceleration transducer characterized by a flexible element formed of a piezoelectric material with two external electrodes, a support member having two plate-type supporting components between which the flexible member is arranged, and a carrier plate to which the support member is mechanically and electrically connected such that the principal axis of sensitivity of the flexible element lies in the same plane as the carrier plate. The supporting components may be formed of a nonconducting material with a electrically conductive coating on the side facing the flexible element and at a point of contact with the carrier base. Alternatively, the supporting components may be made from an electrically conductive material.

20 Claims, 2 Drawing Sheets

PIEZOELECTRIC ACCELERATION TRANSDUCER

BACKGROUND OF THE INVENTION

The invention relates to a piezoelectric acceleration transducer, in particular for use in safety systems for motor vehicles, comprising an assembly consisting of a flexible element which is made of a piezoelectric material and is provided with two external electrodes, and which is secured to a support, the entire assembly being mounted on a substrate or carrier plate. Acceleration transducers of this type are equipped with a flexible element made of piezoelectric material, typically a piezoceramic, as the sensor element, which is mechanically clamped to a reference point, or an arrangement of several such flexible elements. The flexible element is deflected by acceleration or other forces acting on it, producing a voltage at the electrodes of the flexible element as a result of the piezoelectric effect, the said voltage being proportional to the acceleration or other force.

For use in the safety equipment of motor vehicles, so-called series bimorphous flexible sensors are particularly suitable. They consist of an assembly of an even number of ceramic bars, the external faces of which are usually provided with highly electrically conductive coatings, thus forming the external electrodes. Knowledge exists as to how to arrange bimorphous flexible sensors of this type on a substrate mounted in a housing by means of a support, in such a way that the principal axis of sensitivity of the flexible element is perpendicular to the plane of the substrate. Since many motor vehicle manufacturers: require the printed circuit board carrying the evaluation electronics to be arranged in the same plane as the road, the said housing must be mounted to the printed circuit board in such a way that the principal axis of sensitivity lies in the same plane as the printed circuit board, i.e. the housing must be at a 90 degree angle relative to the substrate. This requires a high-cost assembly consisting, first, of a mechanical retaining device to establish the requisite connection between the housing and the printed circuit board and, secondly, or a comb-like conductive structure to produce an electrical connection between the terminal pins on the housing and the printed circuit board itself.

SUMMARY OF THE INVENTION

The object of the invention is to provide a piezoelectric acceleration transducer which does not require a high-cost arrangement for its mounting on a printed circuit board by comparison with known acceleration transducers.

According to the invention, the support consists of two plate-type supporting components, between which the flexible element is arranged. By this means, the support is mechanically connected to the substrate or carrier plate in such a way that the principal axis of sensitivity of the flexible element lies in the same plane as the substrate. An electrically conductive coating is applied to the area where the two supporting components come into contact with the external electrodes of the flexible element. The coating on the supporting components is continued into the area where the supporting components make mechanical contact with the substrate, whereby the point of mechanical contact on the substrate is simultaneously established as a point of electrical contact. In this way, an electrical connection is simultaneously established byway of the mechanical point of contact of the support with the substrate, so that no additional bonded connection is required. The assembly consisting of the flexible element and support is mounted in a housing from which pins projecting perpendicularly to the substrate are connected directly to a printed circuit board without any intermediate retainers or contact-making device.

A further advantage is that the assembly comprising the flexible element and support is thermally isolated from the surroundings of the acceleration transducer, since by the perpendicularity of the latter to the plane of the substrate, a high degree of thermal resistance is achieved between the substrate or the acceleration transducer housing and the flexible element. In addition, due to the symmetrical structure of the assembly, the pyroelectric effect caused by temperature fluctuations is almost entirely suppressed, with the result being that the flexible sensor is virtually pyroelectrically neutral. Finally, because the sensor assembly according to the invention consists of a support and a flexible element, the flexural sensitivity of the sensor is also very slight, since the effects of changes of shape on the housing of the acceleration transducer are transferred only to a negligible extent to the assembly.

In an advantageous embodiment of the invention, each supporting element consists of a bar-shaped component, which extends over the flexible element, and a supporting foot which is connected to the bar, whereby the free end of the supporting foot is connected to a point of contact on the substrate. The face of the free end of this supporting foot should preferably form a butt joint with the substrate. The mechanical and electrical connections between the supporting elements, i.e. the supporting feet and the substrate, are established either by soldering or with an electrically conductive adhesive.

BRIEF DESCRIPTION OF THE DRAWINGS

The invention is explained below with reference to a typical embodiment of a piezoelectric acceleration transducer and associated drawings. These depict the following:

FIG. 2: A diagram showing a plan view of the point of contact of the substrate or carrier plate with the flexible element support as shown in FIG. 1a, FIGS. 3a and 3b: Diagrams showing views of a supporting component corresponding to the typical embodiment shown in FIG. 1a.

DESCRIPTION OF THE PREFERRED EMBODIMENTS

Figure 1A:
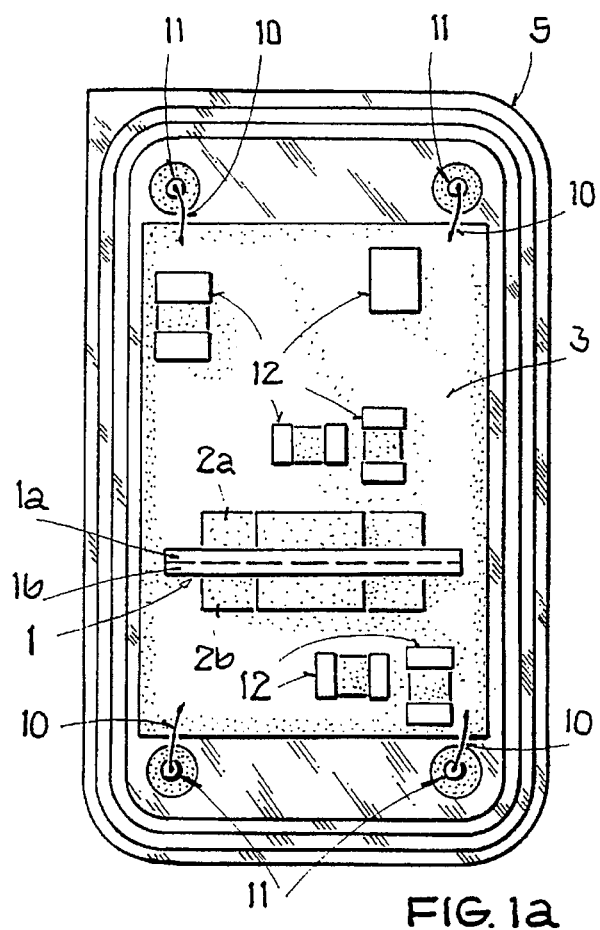
FIGS. 1a, 1b and 1c: Diagrams showing elevations and a plan view of an acceleration transducer according to the invention.

A piezoelectric bimorphous flexible sensor 1 is constructed from two bar-type flexible elements 1a and 1b. The two flexible elements 1a and 1b are represented as piezoceramics, and are each provided with an external electrode not shown in the drawings. The flexible sensor 1 is clamped between two supporting components 2a and 2b (which together form a single support 2) in such a way that the two free ends of the flexible sensor 1 can be deflected under the effect of acceleration or other forces. For this reason, the identically formed supporting components 2a and 2b consist of a bar-shaped component 21, which extends centrally over the flexible sensor 1, and a supporting foot 28 connected to the bar-type component 21, which establishes a mechanical connection with a substrate or carrier plate 3. The two supporting components 2a and 2b are configured as plates of approximately 1 mm in thickness, the bar-type component 21 being approximately 2.5 mm in width and the supporting foot 22 approximately 6 mm in width. The supporting components are made of non-electrically conductive material, more specifically a ceramic.

Figure 1C:
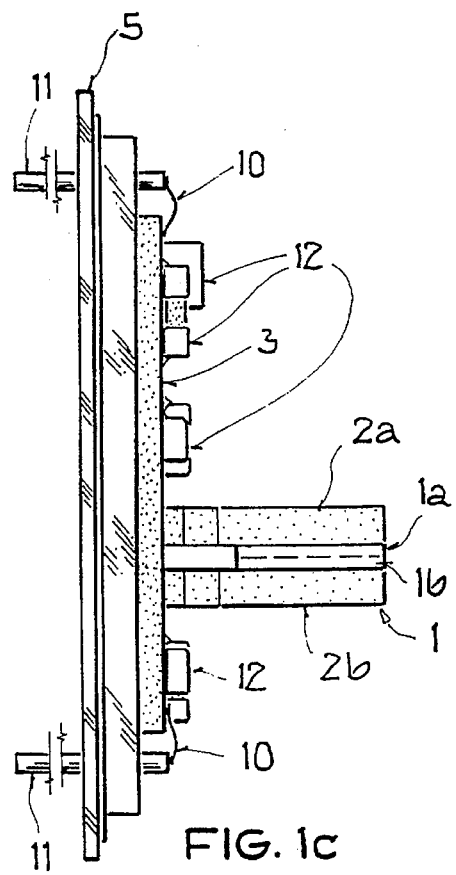
Figure 1B:
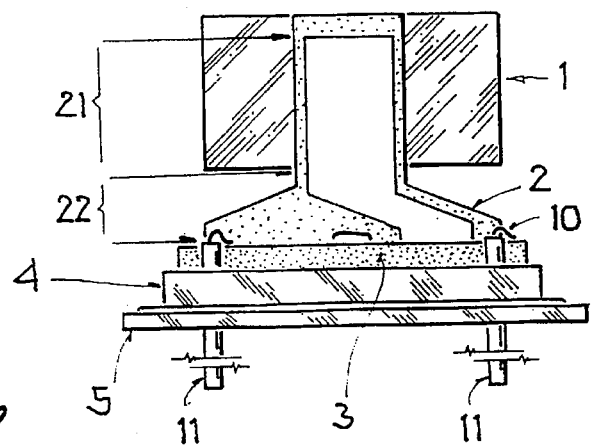
Figure 2:
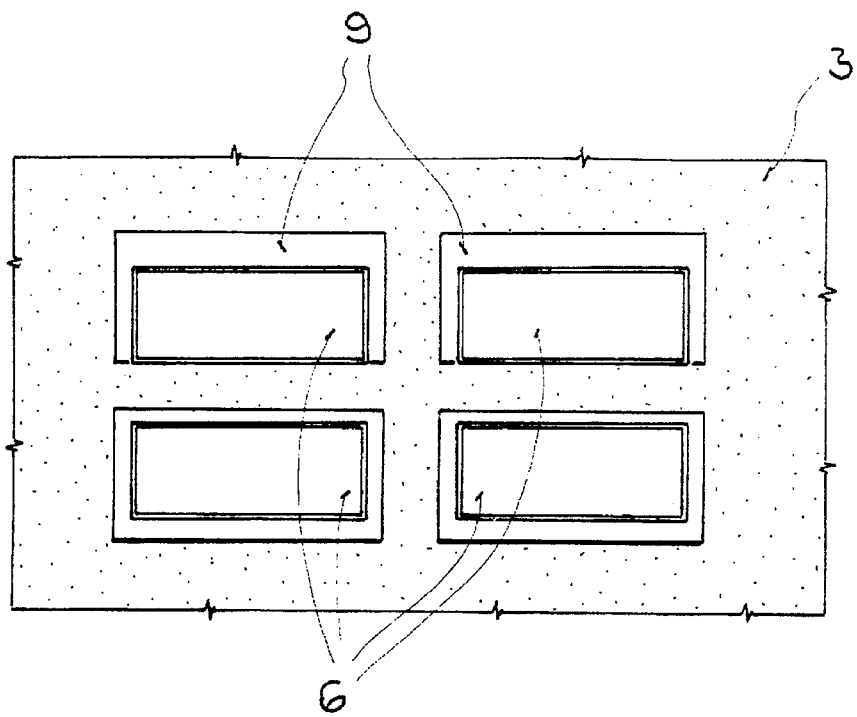
Figure 3A:
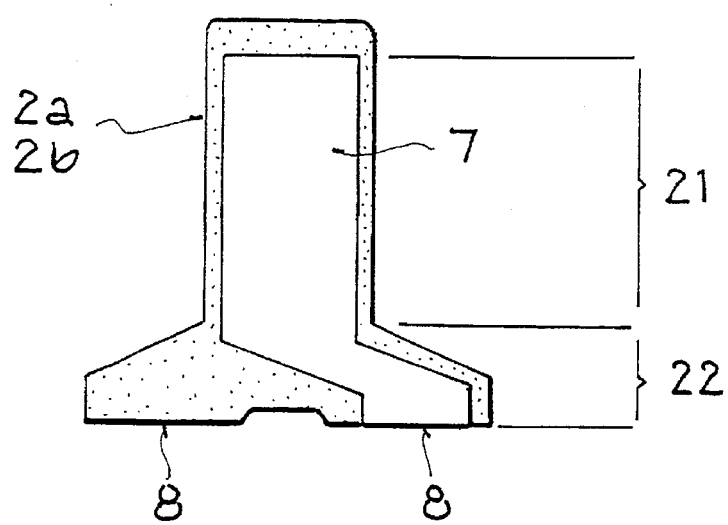
Figure 3B:
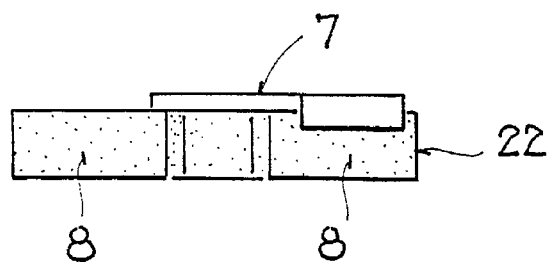

As is depicted in FIGS. 1a to 1c, the assembly consisting of the support 2 and the flexible sensor 1 is arranged perpendicularly to the plane of the substrate or carrier plate 3, so that the principal axis of sensitivity of the flexible sensor 1 lies in the plane of the substrate 3. The substrate 3 is connected to the end-faces 8 of the supporting elements 2a and 2b (as shown in FIGS. 3a and 3b) by points of contact 6 (as shown in FIG. 2). In accordance with FIGS. 3a and 3b, the supporting foot 22 is recessed in the area of the symmetrical axis of the supporting foot 22, with the result that two contact surfaces are created in its end-face 8. In this way, four points of contact 6 are required for the support 2, as shown in FIG. 2. A metallic coating 7 is provided on the sides of the supporting components 2a and 2b facing the flexible sensor 1. The metallic coating 7 also covers the bar-type component 21 and part of the supporting foot 22, and extends to the contact surface of the end-face 8 of one of the stub ends of the supporting foot 22. Since the areas of contact 6 on the substrate or carrier plate 3 also terminate in a conductive strip 9, the flexible sensor 1 is connected to the substrate both mechanically and electrically by way of these contact areas 6. The connection can therefore be established either by soldering of with an electrically conductive adhesive. The metallic coating on the supporting feet 22 of the two supporting components 2a and 2b is applied in such a way that the electrical contact of the four contact areas 6, arranged in a rectangle (as shown in FIG. 2) takes place diagonally, so as to prevent short circuits.

The substrate or carrier plate 3 consists of a ceramic material and serves to accommodate further components 12 which are connected by way of strip conductors arranged on the substrate 3. The ceramic substrate or carrier plate 3 itself is mounted on a baseplate 4, made of metal, ceramic or plastic, which projects beyond the ends of the substrate 3 so as to permit two plug pins 11 to be provided at each end, which are connected by bonded joints 10 to the circuitry on the substrate 3. Finally, the arrangement consisting of the substrate 3 and baseplate 4 is arranged on a housing base 5. The plug pins 11 are guided through the baseplate 4 and the housing base 5 in an insulating manner. To complete the mechanical assembly of the acceleration transducer, a housing (not shown in the drawings) is placed over the assembly mounted on the baseplate 4 so that it fits flush with the housing base 5, thus forming a hermetically sealed enclosure.

It is also possible to make the baseplate 4 and the housing base 5 as a one-piece component.

The acceleration transducer thus completed as a subassembly can now be arranged on a printed circuit board which carries the evaluation electronic circuitry. The plug pins 11 are inserted into corresponding soldering eyelets on the printed circuit board, so that a soldered connection is established, in order to achieve mechanical attachment of the acceleration transducer to the circuit board and the electrical connection at the same time.

The supporting components 2a and 2b of the support 2 can also be made of metallic, e.g. Kovar, in which case the metal coating can be omitted.

The acceleration sensor according to the typical embodiment represents a uni-directional acceleration sensor. To detect acceleration in the plane, a bi-directional sensor can similarly be constructed if two assemblies, each consisting of a flexible element 1 and a support 2, are arranged on the substrate and positioned at a certain angle to each other.

What is claimed is:

1. Piezoelectric acceleration transducer comprising an assembly consisting of a flexible element which is made of a piezoelectric material and is provided with two external electrodes, and which is secured to a support, the assembly being mounted on a carrier plate, wherein:
   a) the support consists of two nonconductive, plate-shaped supporting components, between which the flexible element is arranged;
   b) the supporting components are connected mechanically to the carrier plate by mechanical points of contact in such a way that a principal axis of sensitivity of the flexible element lies in the same plane as the carrier plate;
   c) the two supporting components are each provided with an electrically conductive coating in a respective area of contact with a respective external electrode of the flexible element;
   d) to establish an electrical connection with the carrier plate, the electrically conductive coating on each of said supporting components extends to at least one of said mechanical points of contact between the supporting components and the carrier plate; and
   e) the mechanical points of contact between the supporting components and the carrier plate are configured as electrical points of contact.

2. Piezoelectric acceleration transducer in accordance with claim 1, wherein each of said supporting components is provided with a bar-shaped component which extends over the flexible element and a supporting foot having a first end connected to the bar-shaped component and a second end having a face, with the second end of the supporting foot being connected to the carrier plate at the mechanical points of contact between the supporting components and the carrier plate.

3. Piezoelectric acceleration transducer in accordance with claim 2, wherein the face of the second end of the supporting foot forms a butt joint with the carrier plate.

4. Piezoelectric acceleration transducer in accordance with claim 3, wherein the mechanical connections between the supporting components and the carrier plate are established by soldering or by an electrically conductive adhesive.

5. Piezoelectric acceleration transducer in accordance with claim 4, wherein the supporting foot is wider than the bar-shaped component.

6. Piezoelectric acceleration transducer in accordance with claim 5, wherein the flexible element is configured as a bimorphous flexible sensor.

7. A piezoelectric acceleration transducer in accordance with claim 1, wherein the flexible element has at least one free end, said free end capable of being deflected under the effect of acceleration forces.

8. A piezoelectric acceleration transducer in accordance with claim 1, wherein the supporting components are located relative to the flexible element such that the flexible element has two free ends, said free ends capable of being deflected under the effect of acceleration forces.

9. Piezoelectric acceleration transducer comprising an assembly consisting of a flexible element which is made of a piezoelectric material and is provided with two external electrodes, and which is secured to a support, the assembly being mounted on a carrier plate, wherein:
   a) the support consists of two plate-shaped supporting components, between which the flexible element is arranged;

b) the supporting components are connected mechanically to the carrier plate by points of contact in such a way that a principal axis of sensitivity of the flexible element lies in the same plane as the carrier plate; and c) the two supporting components are made of an electrically conductive material.

10. Piezoelectric acceleration transducer in accordance with claim 9, wherein each of said supporting components is provided with a bar-shaped component which extends over the flexible element and a supporting foot having a first end connected to the bar-shaped component and a second end having a face, with the second end of the supporting foot being connected to the carrier plate at the points of contact between the supporting components and the carrier plate.

11. Piezoelectric acceleration transducer in accordance with claim 10, wherein the face of the second end of the supporting foot forms a butt joint with the carrier plate.

12. Piezoelectric acceleration transducer in accordance with claim 11, wherein the mechanical connections between the supporting components and the carrier plate are established by soldering or by an electrically conductive adhesive.

13. Piezoelectric acceleration transducer in accordance with claim 12, wherein the supporting foot is wider than the bar-shaped component.

14. Piezoelectric acceleration transducer in accordance with claim 13, wherein the flexible element is configured as a bimorphous flexible sensor.

15. A piezoelectric acceleration transducer in accordance with claim 9, wherein the flexible element has at least one free end, said free end capable of being deflected under the effect of acceleration forces.

16. A piezoelectric acceleration transducer in accordance with claim 9, wherein the supporting components are located relative to the flexible element such that the flexible element has two free ends, said free ends capable of being deflected under the effect of acceleration forces.

17. A piezoelectric acceleration transducer, comprising:

(a) a flexible element formed of a piezoelectric material and having a principal axis of sensitivity and two external electrodes;

(b) a support member having two plate-shaped supporting components made of a nonconducting material between which said flexible element is arranged, each of said supporting components having a first side facing said flexible element, a first end, and a second end opposite said first end;

(c) a carrier plate to which said second end of each of said supporting components is mechanically connected such that the principal axis of sensitivity of said flexible element lies in the same plane as said carrier plate; and (d) wherein each of said supporting components has an electrically conductive coating on said first side in contact with a respective external electrode of said flexible element and on said second end such that an electrical connection is established between said flexible element and said carrier plate.

18. A piezoelectric acceleration transducer in accordance with claim 17, wherein each of said supporting components has a bar-shaped component extending over said flexible element and a supporting foot having a first end connected to said bar-shaped component and a second end connected to said carrier plate.

19. A piezoelectric acceleration transducer in accordance with claim 17, wherein said flexible element has at least one free end, said free end capable of being deflected under the effect of acceleration forces.

20. A piezoelectric acceleration transducer in accordance with claim 17, wherein the supporting components are located relative to said flexible element such that said flexible element has two free ends, said free ends capable of being deflected under the effect of acceleration forces.

* * * * *